No. 664,679. Patented Dec. 25, 1900.
L. RENAUD.
ACCUMULATOR.
(Application filed May 24, 1900.)
(No Model.)
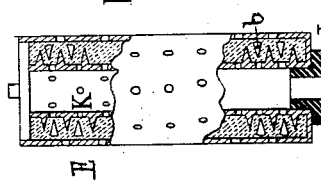
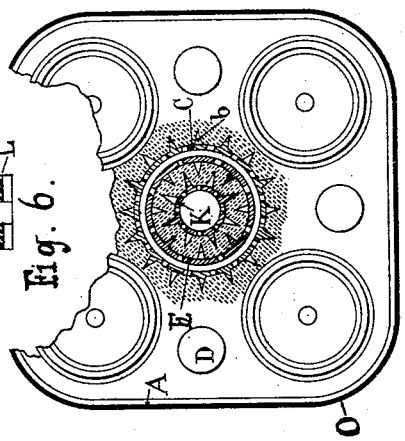
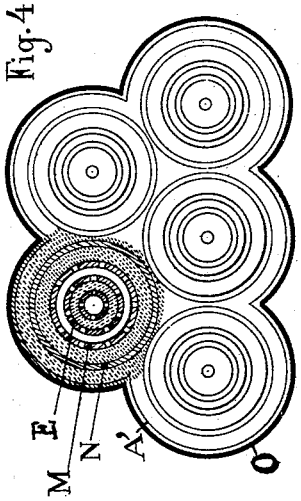
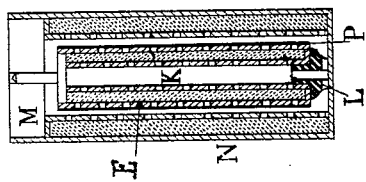
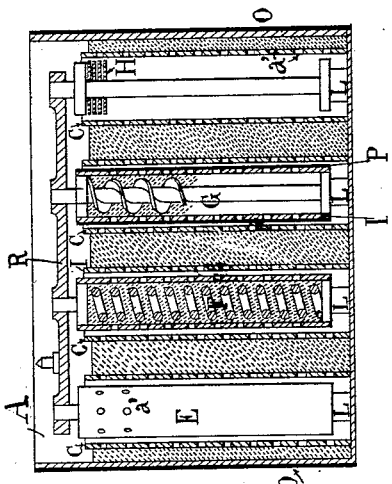
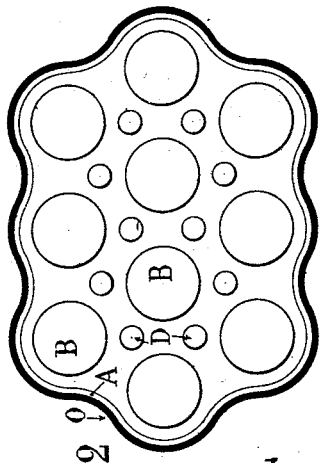
Witnesses:
J. C. Lebret
A. Witt
Inventor:
Louis Renaud,
By H. de Vos
Attorney.

UNITED STATES PATENT OFFICE.

LOUIS RENAUD, OF PARIS, FRANCE.

ACCUMULATOR.

SPECIFICATION forming part of Letters Patent No. 664,679, dated December 25, 1900.

Application filed May 24, 1900. Serial No. 17,813. (No model.)

*To all whom it may concern:*

Be it known that I, LOUIS RENAUD, a citizen of the Republic of France, residing at No. 44 Rue du Louvre, in the city of Paris, in the Republic of France, have invented certain new and useful Improvements in Accumulators, of which the following is a specification, such as will enable others skilled in the art to which it appertains to make and use the same.

The object of my invention is to provide an electrical accumulator or storage battery of a simple and cheap form of construction and high power which will not deteriorate with age.

To such ends my invention consists, in substance, of a receptacle, vessel, or trough partially filled with active material constituting the negative electrode, one or more annular electrodes forming the positive pole, located within the vessel and insulated therefrom, each having one or more concentric spaces filled with an active material, and an electrolyte filling the spaces around the positive electrodes.

Such invention is fully shown and described in the following specification, of which the accompanying drawings form a part, wherein similar letters of reference designate like or equivalent parts wherever found throughout the several views, and in which—

Figure 1 is a side view of my improved form of accumulator in central vertical section. Fig. 2 is a top plan view of the combined vessel and negative electrode. Fig. 3 shows an accumulator having only a single positive electrode. Fig. 4 is a horizontal view, partially in section, of a modified form of the construction shown in Fig. 4. Fig. 5 is a sectional view in elevation of another modified form of positive electrode; and Fig. 6 is a horizontal view, partially in section, of a complete accumulator of the exterior shape shown in Fig. 4, but having the form of positive electrode shown in Fig. 5.

Referring to the drawings, the combined vessel and electrode is composed of a thin lead trough A, filled with an active substance, usually a mixture of seventy per cent. (70%) litharge and thirty per cent. (30%) minium, and formed in the mass of this active substance are, as shown in Fig. 2, cylindrical recesses B to receive the positive electrodes. When it is desired to place it side by side with others, the acid-trough A is coated exteriorly with gutta-percha, paraffin, or other insulating substance O. In the recesses B, made in the active substance of the trough A, there may be inserted lead tubing C, serving to keep the active substance in its place, and said tubing may be soldered onto the bottom of the trough A or fixed in place in any other way or simply allowed to rest upon it. This tubing C is perforated all over its surface with holes $a'$, sufficiently large and numerous to insure a passage for the gases and the electrolyte, and instead of being of lead the said tubing C may sometimes be of any inert or acid-resisting and non-conducting substance, either highly porous by being provided with holes or interstices or by nature, as is porous earthenware. The better to insure the electrolyte penetrating throughout the mass of the active substance inclosed in the trough A, other smaller cylindrical recesses D may be formed in the active substance, as shown in Figs. 2 and 6. The electric current may be taken off either by connections made to the trough A or to the tubings C when such tubes are of conducting material. When more than one element is used, as shown in Fig. 1, the inner electrodes are all connected together by a conductor R of any suitable form. In this way the negative electrode is completely formed.

The positive electrode consists of a cylindrical body E, formed of a tube containing the active substance, which in this case is usually a mixture of twenty-five parts of litharge, seventy-five parts of minium, and a small proportion of sulfate of soda, or a metal wire straight or coiled, as shown at F, or a tubing either provided with bosses or studs, or a spiral, as shown at G, or lead disks laid one over the other, as shown at H, all covered with the active substance, all as shown in Fig. 1, may be used for such positive electrode; but in any event the tube E is filled with and the interior rod, tube, wire, or other lead body is surrounded by the active substance. The positive electrode having been thus formed is inserted in one of the tubings C and is electrically insulated from all contact with the negative electrode by a block of non-conducting material L and in such a way as to be out of contact with the tubing C if this is metallic or of conducting material.

When a central tube K is used, the same is always perforated, and the insulating bottom-support L is then perforated, as shown in Figs. 3 and 5, so as to allow free passage of the electrolyte up into such tube K, and in some cases the outer tube C may be incased, as shown in Fig. 3, in a covering of insulating material P, which in some cases may be imperforate and in others perforate.

In some cases, as shown in Figs. 3 and 4, instead of having the tubes C tubes M may be substituted therefor, located within a cylindrical vessel N, the space between M and N being filled with active negative material, and in such case the electrode so formed may be used either as a small battery or as an electrode, in which latter case it is merely inserted in place in one of the cylindrical perforations B, which in this case are unprovided with the tubings C.

In all cases the positive electrodes are inserted in the cylindrical holes B and sufficient electrolytic liquid, usually a ten-per-cent. (10%) solution of sulfuric acid and water, is poured into the vessel A, so as to fill the holes or perforations B and D to the top, when the accumulator is ready for charging and may then be charged and discharged in the manner usual with accumulators or batteries of this class.

Sometimes the better to insure the contact with the tubings E and K and the holding in place of the active material the inside of the tubing E and the outside of the tubing K are provided with tongues, bosses, or studs $b'$, and sometimes, as shown in Fig. 6, the tube C is provided with like tongues, bosses, or studs on the exterior. While charging, the active material in the annular space between the two tubings E and K increases in volume and presses firmly against the inner surface of the tubing E and the outer surface of the tubing K. Therefore it is necessary that the tubings E and K should be of such thickness and of such stiffness as not to buckle and become deformed by such pressure.

What I claim, and desire to secure by Letters Patent, is—

1. In an electric accumulator or storage battery, the combination with a metallic vessel A containing a mixture of seventy per cent. litharge and thirty per cent. minium in which are perforations, and forming one electrode of another electrode or electrodes consisting of a perforated metallic tube or tubes filled with a mixture of five parts of minium, twenty-five parts of litharge and a modicum of sulfate of sodium located in each of the perforations and out of contact with the vessel A and its active material, and an electrolyte filling the space between the two electrodes, substantially as shown and described.

2. In an electric accumulator or storage battery, the combination with a metallic vessel A containing a mixture of seventy per cent. litharge and thirty per cent. minium in which are perforations, and forming one electrode of another electrode or electrodes consisting of a perforated metallic tube or tubes filled with a mixture of seventy-five parts of minium, twenty-five parts of litharge and a modicum of sulfate of sodium located in each of the perforations and out of contact with the vessel A and its active material, a perforate restraining-tube C forming the outer wall of each perforation, and an electrolyte filling the space between the two electrodes, substantially as shown and described.

3. In an electric accumulator or storage battery, the combination with a metallic vessel A containing a mixture of seventy per cent. of litharge and thirty per cent. minium in which are perforations, and forming one electrode of another electrode or electrodes consisting of a perforated metallic tube or tubes filled with a mixture of seventy-five parts of minium, twenty-five parts of litharge and a modicum of sulfate of sodium located in each of the perforations and out of contact with the vessel A and its active material, each of such electrodes being provided with a central longitudinal hollow, an insulating supporting-block L for each of such electrodes provided with a passage or passages forming a free communication with the central longitudinal hollow of the electrode, and an electrolytic liquid filling the central hollow and the annular space surrounding each of the last-mentioned electrodes, substantially as shown and described.

Signed at Paris, France, this 28th day of April, A. D. 1900.

LOUIS RENAUD.

Witnesses:
EDWARD P. MACLEAN,
LOUIS PEMRIER.